United States Patent [19]

Hampton

[11] 4,337,882
[45] Jul. 6, 1982

[54] GOLF CLUB CART CARRIER

[76] Inventor: Auborn R. Hampton, 1307 Garth Ave., Decatur, Ala. 35601

[21] Appl. No.: 148,754

[22] Filed: May 12, 1980

[51] Int. Cl.³ .............................................. B60R 9/08
[52] U.S. Cl. ........................... 224/42.03 R; 211/60 G; 224/42.07; 224/42.08; 280/492; 280/511
[58] Field of Search .................. 150/1.5 B; 211/60 G; 224/42.03 R, 42.03 A, 42.03 B, 42.04, 42.05, 42.06, 42.07, 42.08, 42.32, 42.38, 42.39; 280/492, 511

[56] References Cited

U.S. PATENT DOCUMENTS

| 558,103 | 4/1896 | Polk | 211/22 |
|---|---|---|---|
| 1,215,477 | 2/1917 | Burch | 224/42.38 |
| 1,475,605 | 11/1923 | Smith | 224/42.39 |
| 1,628,771 | 5/1927 | Frisk | 224/42.39 |
| 1,683,169 | 9/1928 | DeNoya | 224/42.39 |
| 2,221,278 | 11/1940 | Utterback | 280/492 |
| 2,592,050 | 4/1952 | McCharen | 224/42.03 R |
| 2,709,545 | 5/1955 | Cryer | 224/42.04 |
| 3,413,012 | 11/1968 | Coffman | 224/274 X |
| 3,428,230 | 2/1969 | Korf et al. | 224/42.06 |
| 3,458,073 | 7/1969 | Dawson | 224/42.08 X |
| 3,779,580 | 12/1973 | Thelen | 224/42.06 X |
| 3,900,212 | 8/1975 | Ewing | 280/492 X |
| 4,061,257 | 12/1977 | St. Clair | 211/60 G X |
| 4,241,858 | 12/1980 | Lawroski | 224/42.03 RX |

FOREIGN PATENT DOCUMENTS 337186 10/1930 United Kingdom ............. 224/42.32

Primary Examiner—Allan N. Shoap
Attorney, Agent, or Firm—C. A. Phillips

[57] ABSTRACT

A golf club cart carrier supportable on a trailer hitch mounting bar, there being an upwardly sloping arm pivotally attached to the bar having at an outer end a vertical tubular socket adapted to mate with a tubular extension on the carrier.

9 Claims, 11 Drawing Figures

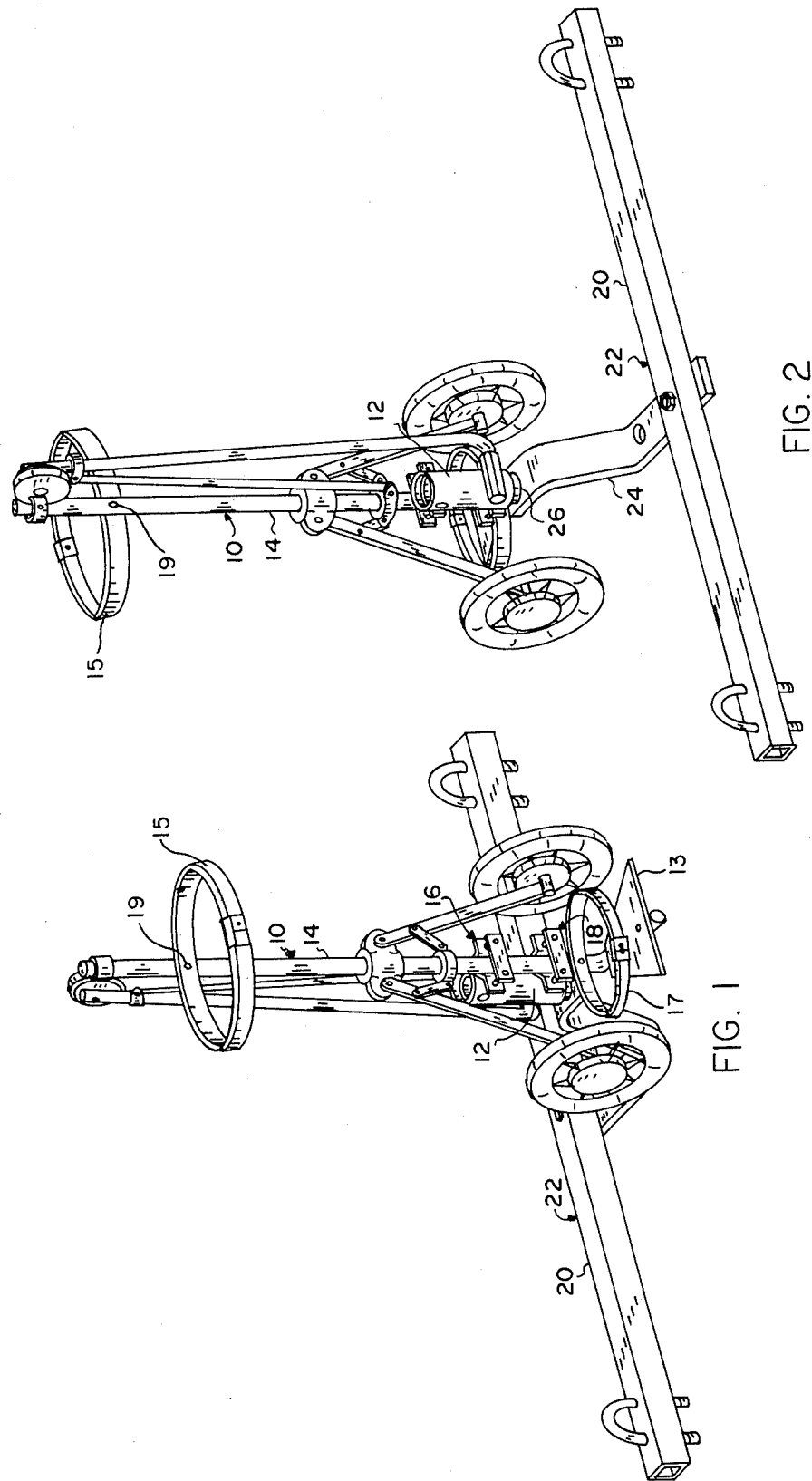

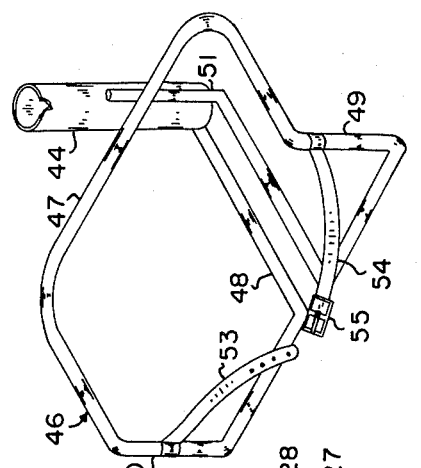
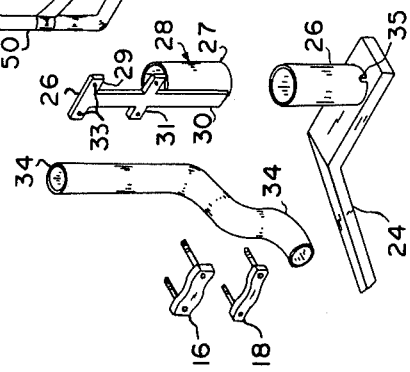
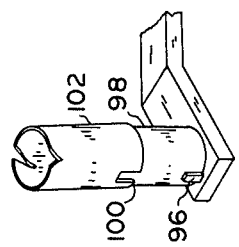
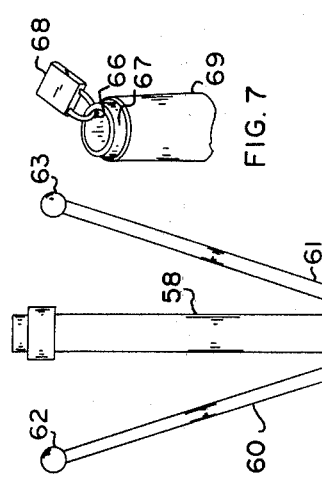
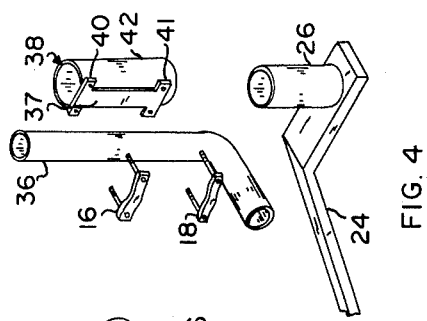
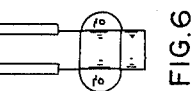

GOLF CLUB CART CARRIER

TECHNICAL FIELD

This invention relates to devices for supporting golf carts on the rear of an automotive vehicle.

BACKGROUND ART

While a variety of mounting devices have appeared for the support of luggage, bicycles and perhaps other items on the rear of an automobile, the applicant is unaware of any such devices which would readily accommodate a golf cart. This absence has created a very substantial need in that it is simply inconvenient, or, in some instances, impossible to carry golf carts in the rear compartment of an automobile as well as being quite difficult to remove them.

DISCLOSURE OF INVENTION

In accordance with this invention, a golf cart is especially constructed with a vertical tubular (e.g., round) socket, and there is attached a trailer hitch type mounting arm on the rear of a vehicle having a tubular member adapted to mate with the tubular socket and thus support a golf cart.

BRIEF DESCRIPTION OF THE DRAWINGS

FIG. 1 is a perspective view taken from the rear of a golf club cart carrier wherein the golf club cart is conventional and includes a carrier mounting system as contemplated by this invention.

FIG. 2 is a perspective view of the device and system of FIG. 1 shown from the front as it would be installed.

FIG. 3 is a pictorial and exploded view of a mounting system illustrating in greater detail an attachment between a cart and a vehicle mounted supporting member.

FIG. 4 illustrates a modification of the mounting system shown in FIG. 3 wherein the central support member of the cart has a single right angle bend at the bottom.

FIG. 5 is a perspective view illustrating a modification of the cart structure shown in FIGS. 1 and 2 wherein the basic cart structure is adapted to include a tubular socket.

FIG. 6 illustrates a rear partial view of a golf cart central tubular member modified to include a pair of shoe supports.

FIG. 7 is a pictorial view illustrating a device for locking the carrier on a tubular socket attached to a vehicle, whereby the carrier is secured to a vehicle.

FIG. 11 is a partial pictorial and exploded view illustrating a detail of construction.

BEST MODE FOR CARRYING OUT THE INVENTION

Figure 8:
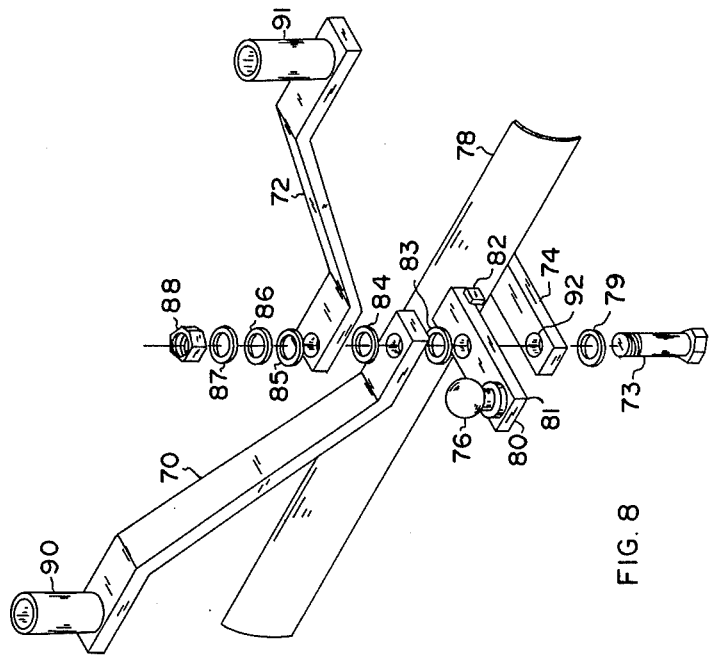
FIG. 8 is an exploded pictorial view of a vehicle mounting structure as contemplated by this invention.

Referring initially to FIG. 2, there is illustrated generally a conventional golf club cart 10 having a lower platform 13 for supporting a bag vertically and an upper positioned strap 15 and a lower positioned strap 17 fixedly attached by bolts 19 to support member 14. There is additionally provided, however, a tubular mount 12 formed of a short, four to six inches, section of pipe. Tubular member 12 is attached to central support member 14 of cart 10 by clamping assemblies 16 and 18 which are attached, as by welding, to tubular member 12, and are in turn attachable by bolts (not shown) to central support 14. As thus modified by the attachment of tubular member 12, cart 10 is readily mounted on a vehicle mounted support 20. Support 20 consists of a cross arm 22 and supports rearwardly extending bar 24, which in turn supports tubular socket member 26, over which tubular member 12 is positioned to support cart 10. Cross arm 22 is conventionally attachable to a vehicle, or bar 24 may, in some instances, be directly connected to the frame or bumper of a vehicle.

FIG. 3 illustrates in greater detail a clamping assembly for the attachment of a tubular member 27 to a conventional golf club cart with elbowed central support member 34. In this instance, adapter assembly 28 consists of an upwardly extending bracket 30 welded to tubular member 27 and having a pair of spaced cross arms 29 and 31. These have openings 33 adapted to receive bolt ends of spaced U clamps 16 and 18, which would thus, when bolted in place, clamp vertical support 34 of a cart to cross arms 29 and 31 and thereby to tubular support member 27. Tubular support member 27, having a water drainage hole 35, mounts on tubular socket member 26, in turn supported by vehicle mounted bar 24.

FIG. 4 illustrates a modification of the system illustrated in FIG. 3 wherein central support member 36 of the cart is modified to have a single right angle bend rather than two as shown in FIG. 3. This enables a modification of a bracket assembly 38 wherein, as shown, vertical arm 37 is shorter, and cross arms 40 and 41 are directly opposite tubular socket member 42. However, adapter assembly 28 of FIG. 3 will also work with central support 36 of FIG. 4.

FIG. 5 illustrates a modification of the invention wherein central support 44 of a cart (which would be employed in place of central support 14 of cart 10, as shown in FIGS. 1 and 2) extends generally vertically and has an unobstructed open lower end 45 which is directly adaptable to mount on a tubular socket member, such as illustrated by socket member 26 shown in FIGS. 3 and 4.

The cart includes a lower positioned bag support 46 formed of a length of tubing, in turn formed into an upper semi-circular portion 47 and a lower T-shaped portion 48, these two portions being joined by vertical connecting sections 49 and 50. The end regions 51 of the tubing are bent up along the side wall of central support 44 and attached to the latter (by means not shown). The center of the semi-circular portion 47 is also attached (by means not shown) to central support 44. Strap members 53 and 54 extend from vertical sections 49 and 50, strap member 54 having a buckle 55 which is adapted to couple to attachment holes in the end of member 53.

FIG. 6 illustrates the attachment to central support 58 of a pair of shoe holding brackets 60 and 61, they being attached, as by bolting or welding, at a lower end region to central support 58 and extending upwardly and outwardly at an angle of 10° to 16° from central support 58 for an individual length of from 10 to 13 inches (overall length, including the lower bent portion, as shown). The ends of brackets 60 and 61 comprise smooth shoe protection end regions 62 and 63. Shoes are simply placed over the upper ends of the brackets and are thus held.

FIG. 7 illustrates the incorporation of an opening 66 on the top of tubular socket member 67, otherwise like tubular socket member 26 of FIG. 4. Lock 68 connects through opening 66 to prevent removal of tubular member 69 of a golf cart, as described above.

Figure 10:
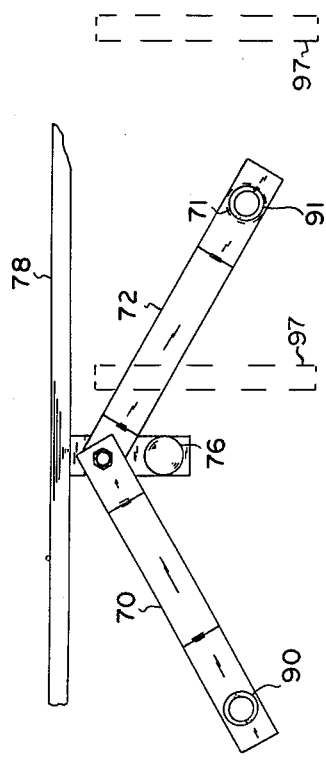
FIG. 10 is a top plan view of the structure shown in FIG. 8.
Figure 9:
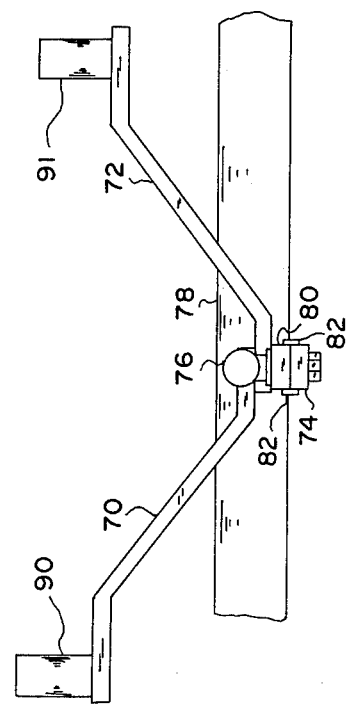
FIG. 9 is a rear elevational view of the structure shown in FIG. 8.

FIGS. 8-10 illustrate an embodiment of the invention wherein a pair of upwardly extending arms 70 and 72 are attached by means of a bolt 73 to a trailer hitch mounting bar 74, the point of attachment of bolt 73 being between ball 76 and bumper 78 of a vehicle. Bolt 73 is attached in a manner to effect a frictional attachment of arms 70 and 72, whereby the arms may be rotated to a selected position, and with no cart or carts present, they will remain there. This is accomplished by the employment of a serial arrangement of washers, as shown, wherein a lock washer 79 is simply positioned over bolt 73, and bolt 73 is inserted vertically upward through a vehicle support bar 74, typically one wherein a trailer hitch ball would be attached. Then, an extension bar 80, having a ball 76 mounted to its end 81, and anchor tabs 82 mounted to the other end, is attached via the insertion of bolt 73 upward through bars 74 and 80. Then, a plastic (e.g., polyethylene) material washer 83 is positioned on bolt 73 and then a first arm 70 placed over the bolt. Then, a second plastic type washer 84 is placed on bolt 73, and then the second mounting arm 72 is placed over it. Then, over mounting arm 72 is placed a third plastic type washer 85, and then on it a plain steel washer 86 is followed by a lock washer 87. Finally, a nut 88 is attached and is simply tightened. By this system, a pair of mounting arms 70 and 72 are attached, enabling a pair of golf cart carriers as described to be mounted. By virtue of the positioning of the plastic washers, arms 70 and 72 may be hand positioned to a selected position, and they will remain there by virtue of the frictional force of the plastic washers so long as the arms are not loaded by carts. Nut 88 is tightened to a degree to enable this degree of application of frictional force by the plastic washers. By this means, arms 70 and 72 may be moved to a position as shown in FIG. 10 wherein tubular socket members 90 and 91 are rearward of the position of ball 76, thus providing ample room for the mounting of a cart on a socket member; and then, upon the removal of a cart or carts, arm members 70 and 72 may be moved toward bumper 78, thus preventing any obstruction behind trailer hitch ball extension bar 80. Further, by this arrangement, no special assembly is required to attach the carrier mounting system for a vehicle since typically bar 72 would be already attached to the vehicle. Typically, it would only then be necessary to remove a ball 76 from its normal mounting position in opening 92, attaching it to an extension bar 80, and then mounting the assembly as described, a very simple arrangement. Alternately, where there is no desire for the separate employment of a trailer hitch ball, the basic mounting bar 74 employed for a trailer hitch would be attached in a standard manner to a vehicle, but no ball would be used, and thus extension arm member 80 would not be used at all. When carts are being held or supported on arms 70 and/or 72, (e.g., by a tubular support 71 shown in dashed lines in FIG. 10), wheels 97 of the carts would typically prevent rotation of the arms in one direction, and ball 76 would prevent rotation of the arms in the other direction. Where a single arm is employed without a ball 76, the arms would typically be made shorter, and the wheels of a cart would generally prevent rotation of the cart.

FIG. 11 illustrates the employment of a locking tab 96 on a socket member 98 adapted to lock within a slot 100 in a tubular support member 102 and thus prevent rotation of the latter. This arrangement, of course, may be employed with any of the related structures shown in the other figures.

By virtue of the present invention, a very effective, strong and conveniently usable arrangement is provided for the supporting of a golf cart or carts on a vehicle. Essentially, no obstruction is provided behind the vehicle when golf carriers are not employed, and thus no objectionable features are introduced by the use of the carrier system. Carts can be readily positioned in place on the carrier, may be locked in place where desired, and may be readily and easily removed.

I claim:

1. A golf club carrier comprising:
    a golf club cart comprising:
        elongated support means extending vertically and having a downwardly extending open end tubular end region, and
        bag holding means comprising means for supporting a golf bag on said elongated support means, and including a lower positioned platform and a vertical support extending upwardly therefrom and a plurality of fixed, spaced lateral supports, transverse to and connected to said vertical support, and said vertical support joined to said elongated support means; and
    vehicle supported attachment means adapted to be attached to the rear of an automotive vehicle, and including a generally vertical tubular socket member adapted to removably mate within said tubular end region of said elongated support means of said golf cart.

2. A carrier as set forth in claim 1 wherein said elongated support means comprises said vertical support and a tubular member attached in a parallel position with and to the side of said vertical support, said tubular member providing said tubular end region.

3. A carrier as set forth in claim 2 including clamping means for clamping said tubular member to said vertical support.

4. A carrier as set forth in claim 1 wherein said vehicle supported attachment means comprises:
    a bar extending generally horizontally out and rearward from the rear of an automotive vehicle;
    an upwardly extending bolt supported by said bar;
    at least one support arm rising generally along a slope from said bolt;
    attachment means for pivotally and frictionally coupling said arm to said bar through said bolt, enabling said arm to be selectively positionable along a line which varies in direction; and
    a said tubular socket member is mounted on a higher elevation end of said arm;
    whereby the distance between the rear of a vehicle and said socket member is variable, enabling adequate clearance between said golf cart and the rear of the vehicle, and said support arm being movable to the rear of the vehicle when the carrier is unused, whereby a minimum protrusion beyond the rear of the vehicle is achieved.

5. A carrier as set forth in claim 4 further comprising a pair of shoe supporting arms supported on and extending at an angle upward from said rod.

6. A carrier as set forth in claim 4 further comprising locking means engaging between said tubular socket member and said tubular end region for preventing rotation of said tubular end region with respect to said arm.

7. A carrier as set forth in claim 4 wherein said support means comprises said trailer hitch mount having means for mounting a hitch ball at the end of said bar, and said bolt is positioned intermediate between the point of mounting of a said ball and a vehicle to which said support means is attached.

8. A carrier as set forth in claim 4 wherein:
said support means comprises a second bar and means for rigidly attaching said second bar aligned in a rearward direction with respect to a said vehicle and attachment being through said bolt to said first-named bar; and
means for mounting a trailer hitch at the rearward end of said second bar;
whereby a single support attachment to a vehicle may provide alternately for coupling a trailer to the vehicle or for the support of a golf bag.

9. A carrier as set forth in claim 1 wherein said elongated support rod means comprises said vertical support, and the lower end of said vertical support comprises said open end tubular end region.

* * * * *